United States Patent
Hsu et al.

(10) Patent No.: US 11,142,932 B2
(45) Date of Patent: Oct. 12, 2021

(54) DUAL-SHAFT HINGE MODULE AND PORTABLE ELECTRONIC DEVICE

(71) Applicants: Chia-Hao Hsu, Taipei (TW); You-Yu Chen, Taipei (TW); Hsin-Hung Lee, Taipei (TW)

(72) Inventors: Chia-Hao Hsu, Taipei (TW); You-Yu Chen, Taipei (TW); Hsin-Hung Lee, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/816,219

(22) Filed: Mar. 11, 2020

(65) Prior Publication Data

US 2020/0291702 A1 Sep. 17, 2020

Related U.S. Application Data

(60) Provisional application No. 62/817,509, filed on Mar. 12, 2019.

(51) Int. Cl.
*E05D 3/12* (2006.01)
*G06F 1/16* (2006.01)

(52) U.S. Cl.
CPC .......... *E05D 3/122* (2013.01); *G06F 1/1681* (2013.01); *E05Y 2900/606* (2013.01)

(58) Field of Classification Search
CPC .. E05D 3/122; G06F 1/1681; E05Y 2900/606
See application file for complete search history.

(56) References Cited

U.S. PATENT DOCUMENTS

| | | | | |
|---|---|---|---|---|
| 9,342,101 | B2 * | 5/2016 | Hsu | G06F 1/1679 |
| 9,439,311 | B2 * | 9/2016 | Hsu | E05D 3/122 |
| 9,677,308 | B1 * | 6/2017 | Chen | G06F 1/1681 |
| 9,684,343 | B2 * | 6/2017 | Tazbaz | G06F 1/1637 |
| 9,915,086 | B2 * | 3/2018 | Kato | E05D 11/087 |
| 10,082,838 | B1 * | 9/2018 | Hong | E05D 7/00 |
| 10,303,223 | B2 * | 5/2019 | Park | F16C 11/04 |
| 10,845,850 | B1 * | 11/2020 | Kang | E05D 3/122 |
| 10,871,803 | B2 * | 12/2020 | Wu | G06F 1/1681 |

(Continued)

FOREIGN PATENT DOCUMENTS

| | | |
|---|---|---|
| CN | 104019120 | 9/2014 |
| TW | M546082 | 7/2017 |

OTHER PUBLICATIONS

"Office Action of China Counterpart Application", dated Jan. 22, 2021, pp. 1-9.

*Primary Examiner* — Victor D Batson
*Assistant Examiner* — Matthew J Sullivan
(74) *Attorney, Agent, or Firm* — JCIPRNET

(57) ABSTRACT

A dual-shaft hinge module including a first shaft, a first driving gear disposed on the first shaft, a second shaft, a second driving gear disposed on the second shaft, a pair of driven gears coupled between the first driving gear and the second driving gear, and multiple links is provided. The links are respectively pivoted to any two engaged gears to keep a center distance of the engaged gears fixed. A relative distance of the first shaft and the second shaft is changed along with different engagement positions of the driven gears relative to the first driving gear and the second driving gear. A portable electronic device is also provided.

15 Claims, 5 Drawing Sheets

(56) References Cited

U.S. PATENT DOCUMENTS

| | | | |
|---|---|---|---|
| 2011/0000136 A1* | 1/2011 | Brun | E05D 11/0081 |
| | | | 49/358 |
| 2012/0149438 A1* | 6/2012 | Kwon | H04M 1/022 |
| | | | 455/566 |
| 2012/0182677 A1* | 7/2012 | Seo | H04B 1/385 |
| | | | 361/679.01 |
| 2015/0361696 A1* | 12/2015 | Tazbaz | G06F 1/1681 |
| | | | 361/679.27 |
| 2016/0070310 A1* | 3/2016 | Holung | G06F 1/1681 |
| | | | 361/679.09 |
| 2020/0012322 A1* | 1/2020 | Jan | G06F 1/1618 |
| 2020/0267245 A1* | 8/2020 | Li | E05D 11/0054 |
| 2020/0326756 A1* | 10/2020 | Siddiqui | E05D 3/122 |
| 2020/0329573 A1* | 10/2020 | Huang | H05K 5/0226 |
| 2020/0409422 A1* | 12/2020 | Wang | H05K 5/0226 |
| 2020/0413557 A1* | 12/2020 | Zhang | E05D 3/18 |

* cited by examiner

DUAL-SHAFT HINGE MODULE AND PORTABLE ELECTRONIC DEVICE

CROSS-REFERENCE TO RELATED APPLICATION

This application claims the priority benefit of U.S. provisional application Ser. No. 62/817,509, filed on Mar. 12, 2019. The entirety of the above-mentioned patent application is hereby incorporated by reference herein and made a part of this specification.

BACKGROUND

Technical Field

The disclosure relates to a hinge module and an electronic device, and more particularly to a dual-shaft hinge module and a portable electronic device.

Description of Related Art

For conventional portable electronic devices, such as notebook computers or mobile phones, the display screen and the host may be rotated to open and close relative to each other through a hinge module. In addition to being able to be positioned at various angles for corresponding operations, the display screen and the host may even be folded to overlap into a flat state at a large angle such as 360°, so as to provide another deformed usage configuration.

In addition, along with changes in the usage state, an additional accessory may be further placed between the display screen and the host to expand the function of the portable electronic device currently. However, for conventional hinge modules, the wheelbase between shafts is fixed, so the conventional hinge modules can only cope with the general usage state. Once the additional accessory is added as described above, there will be space limitation to the fixed hinge module. In other words, in the case where the body of the hinge module with fixed wheelbase has a fixed space correspondence relationship, it is difficult to meet the usage requirements of having additional accessories.

SUMMARY

The disclosure provides a dual-shaft hinge module and a portable electronic device, wherein the dual-shaft hinge module can provide an adjustable shaft wheelbase and allows different bodies of the portable electronic device to be synchronously rotated.

The dual-shaft hinge module of the disclosure includes a first shaft, a first driving gear, a second shaft, a second driving gear, a pair of driven gears, and multiple links. The first driving gear is disposed on the first shaft, the second driving gear is disposed on the second shaft, and the driven gears are coupled between the first driving gear and the second driving gear. The links are respectively pivoted between the first driving gear and one of the driven gears, between the driven gears, and between another one of the driven gears and the second driving gear to keep a center distance of engaged gears fixed. A relative distance of the first shaft and the second shaft is changed along with different engagement positions of the driven gears relative to the first driving gear and the second driving gear.

The portable electronic device of the disclosure includes a first body, a second body, and a dual-shaft hinge module. The dual-shaft hinge module includes a first shaft, a first driving gear, a second shaft, a second driving gear, a pair of driven gears, and multiple links. The first shaft is assembled to the first body and the second shaft is assembled to the second body. The first driving gear is disposed on the first shaft, the second driving gear is disposed on the second shaft, and the driven gears are coupled between the first driving gear and the second driving gear. The links are respectively pivoted between the first driving gear and one of the driven gears, between the driven gears, and between another one of the driven gears and the second driving gear to keep a center distance of engaged gears fixed. A relative distance of the first shaft and the second shaft changes along with different engagement positions of the driven gears relative to the first driving gear and the second driving gear. When the first body and the second body move away from each other along with the first shaft and the second shaft, an accommodation space is formed between the first body and the second body.

In an embodiment of the disclosure, the portable electronic device further includes an accessory, disposed in the accommodation space and configured to support the first body and the second body, so as to keep a state in which the first shaft and the second shaft are away from each other.

In an embodiment of the disclosure, the first driving gear and the first shaft are coaxially disposed and synchronously rotated, the second driving gear and the second shaft are coaxially disposed and synchronously rotated, and the first shaft and the second shaft are synchronously rotated through the first driving gear, the driven gears, and the second driving gear.

In an embodiment of the disclosure, a rotation axis of the first driving gear, a rotation axis of the second driving gear, and rotation axes of the driven gears are parallel to one another.

In an embodiment of the disclosure, the rotation axis of the first driving gear and the rotation axis of the second driving gear form a first plane, the rotation axes of the driven gears form a second plane, and the second plane is inclined relative to the first plane.

In an embodiment of the disclosure, the dual-shaft hinge module further includes a limiting member, having at least one limiting groove, and the first shaft and the second shaft pass through the limiting groove of the limiting member in parallel with each other.

In an embodiment of the disclosure, the limiting member further has an accommodation groove, and the first driving gear, the second driving gear, and the driven gears are located in the accommodation groove.

In an embodiment of the disclosure, the dual-shaft hinge module further includes a reset mechanism, disposed between the first shaft and the second shaft. When the first shaft and the second shaft form multiple states due to changes in the relative distance, the reset mechanism is configured to drive the first shaft and the second shaft to be in one of the states.

In an embodiment of the disclosure, the reset mechanism includes at least one spring connected between the first shaft and the second shaft.

Based on the above, the dual-shaft hinge module disposes a gear set between the first shaft and the second shaft, wherein the first driving gear of the gear set is disposed on the first shaft, the second driving gear is disposed on the second shaft, and the driven gears of the gear set are coupled between the first driving gear and the second driving gear, so that the first driving shaft and the second driving shaft can achieve the effect of synchronous rotation through the gear set. Furthermore, any two engaged gears of the gear set are further respectively pivoted through the links, such that the any two engaged gears can also keep the center distance fixed during the process of synchronous rotation. Accordingly, the gear set can adjust the relative distance of the first shaft and the second shaft according to the requirements under the limitation of the links.

In this way, for the dual-shaft hinge module or the portable electronic device applying the dual-shaft hinge module, the relative distance between the shafts or the relative distance between the bodies can be adjusted accordingly, thereby providing additional space for utilization, such that the freed up space of the body can accommodate another additional accessory.

To make the aforementioned and other features of the disclosure more comprehensible, several embodiments accompanied with drawings are described in detail as follows.

DETAILED DESCRIPTION OF DISCLOSED EMBODIMENTS

Figure 1:
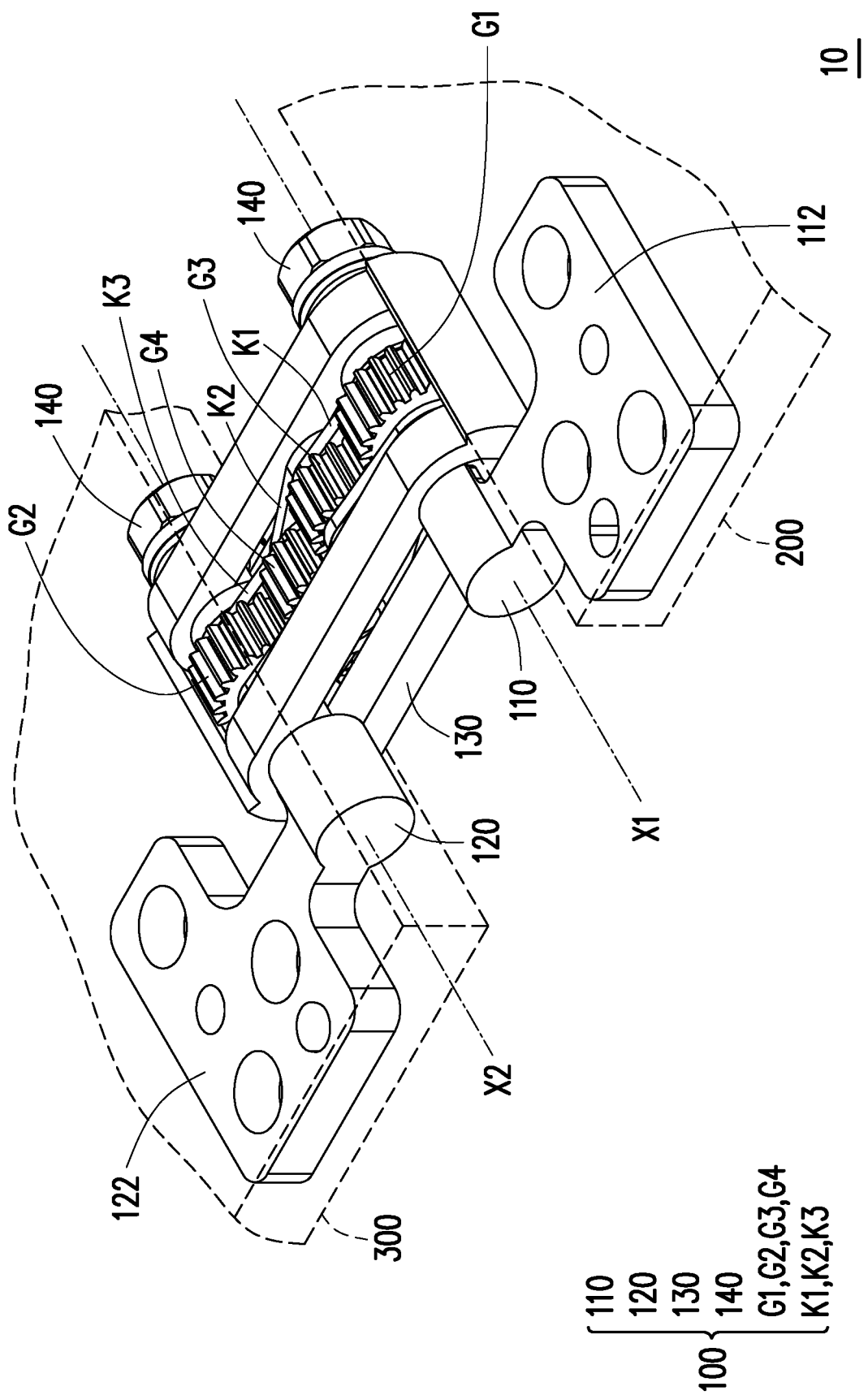
FIG. 1 is a schematic view of a portion of a portable electronic device according to an embodiment of the disclosure.
Figure 2:
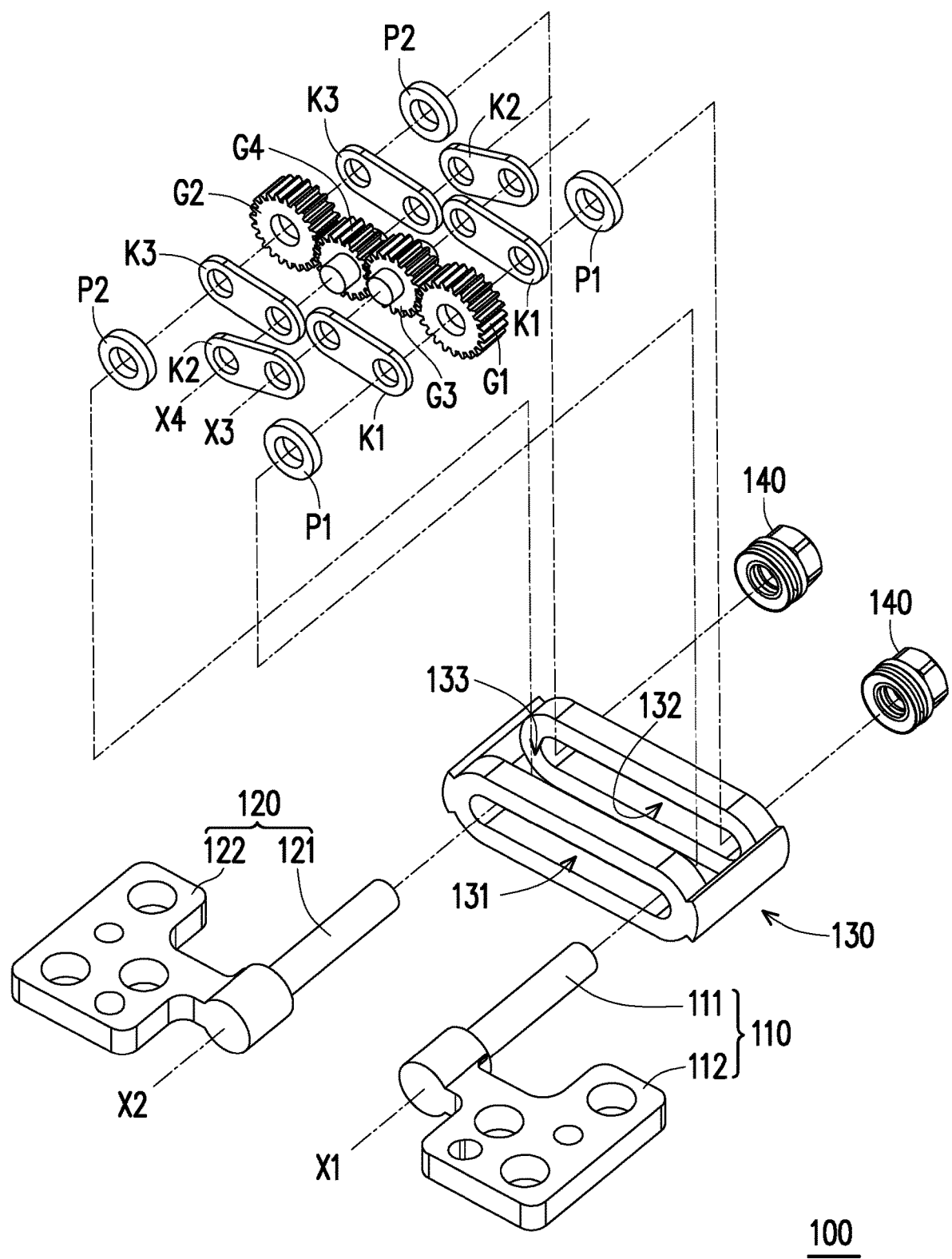
FIG. 2 is an exploded view of a dual-shaft hinge module of FIG. 1.

FIG. 1 is a schematic view of a portion of a portable electronic device according to an embodiment of the disclosure. FIG. 2 is an exploded view of a dual-shaft hinge module of FIG. 1. Please refer to FIG. 1 and FIG. 2 at the same time. In the embodiment, a portable electronic device 10 includes a first body 200, a second body 300, and a dual-shaft hinge module 100, wherein the dual-shaft hinge module 100 includes a first shaft 110, a first driving gear G1, a second shaft 120, a second driving gear G2, a pair of driven gears G3 and G4, and multiple links K1 to K3. The first shaft 110 includes a shaft portion 111 and a bracket 112. The bracket 112 is assembled to the first body 200 and the first driving gear G1 is disposed on the shaft portion 111. The second shaft 120 includes a shaft portion 121 and a bracket 122. The bracket 122 is assembled to the second body 300 and the second driving gear G2 is disposed on the shaft portion 121. The driven gears G3 and G4 are coupled between the first driving gear G1 and the second driving gear G2. The link K1 is pivoted between the first driving gear G1 and the driven gear G3, the link K2 is pivoted between the driven gears G3 and G4, and the link K3 is pivoted between the driven gear G4 and the second driving gear G2.

Further, the dual-shaft hinge module 100 further includes a limiting member 130, a pair of torque members 140, and multiple spacers P1 and P2. The limiting member 130 has a pair of limiting grooves 131 and 132 corresponding to each other and an accommodation groove 133 located between the pair of limiting grooves 131 and 132. The shaft portions 111 and 121 of the first shaft 110 and the second shaft 120 are butted to the torque members 140 after respectively passing through the limiting grooves 131 and 132, so that the first driving gear G1, the second driving gear G2, and the driven gears G3 and G4 are accommodated in the accommodation groove 133, and through the collocation of the spacers P1 and P2 (one pair of the spacers P1 are sleeved on the shaft portion 111 such that the link K1 and the first driving gear G1 are abutted therebetween, and one pair of the spacers P2 are sleeved on the shaft portion 121 such that the link K3 and the second driving gear G2 are abutted therebetween) and the torque members 140, the torque required by the first shaft 110 and the second shaft 120 during relative rotation can be generated.

Accordingly, the first driving gear G1 and the first shaft 110 are coaxially disposed and synchronously rotated, and the second driving gear G2 and the second shaft 120 are coaxially disposed and synchronously rotated, such that the first shaft 110 and the second shaft 120 (also equivalent to the first body 200 and the second body 300) may be synchronously rotated through the first driving gear G1, the driven gears G3 and G4, and the second driving gear G2, wherein a rotation axis X1 of the first driving gear G1, a rotation axis X2 of the second driving gear G2, and rotation axes X3 and X4 of the driven gears G3 and G4 are arranged in parallel with one another, and the first shaft 110 and the second shaft 120 are further limited by the limiting grooves 131 and 132. Here, the interference fit of the shaft portion 111 and the first driving gear G1 is with the inner and outer diameters, and the interference fit of the shaft portion 121 and the second driving gear G2 is with the inner and outer diameters to achieve the required synchronous driving effect. In another unillustrated embodiment, the same effect may be achieved by a non-circular shaft and hole fit between the shaft portion and the driving gear.

Figure 3A:
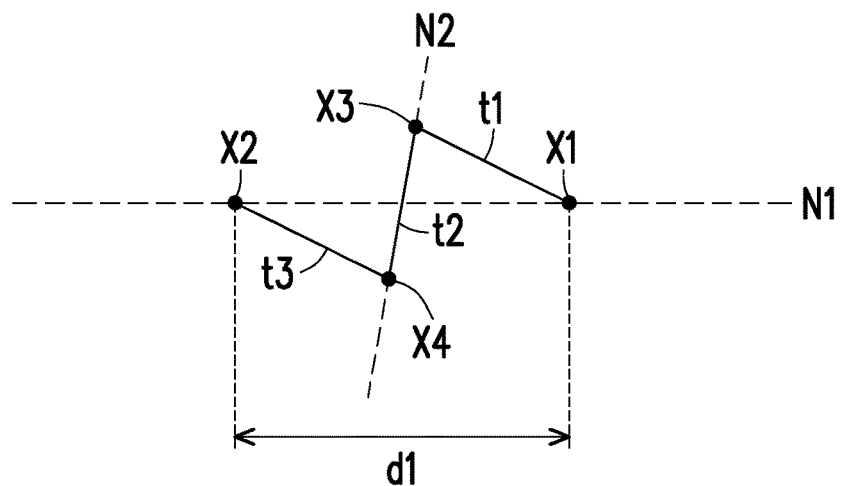
FIG. 3A and FIG. 3B are respectively side views of a portable electronic device in different states.
Figure 3A:
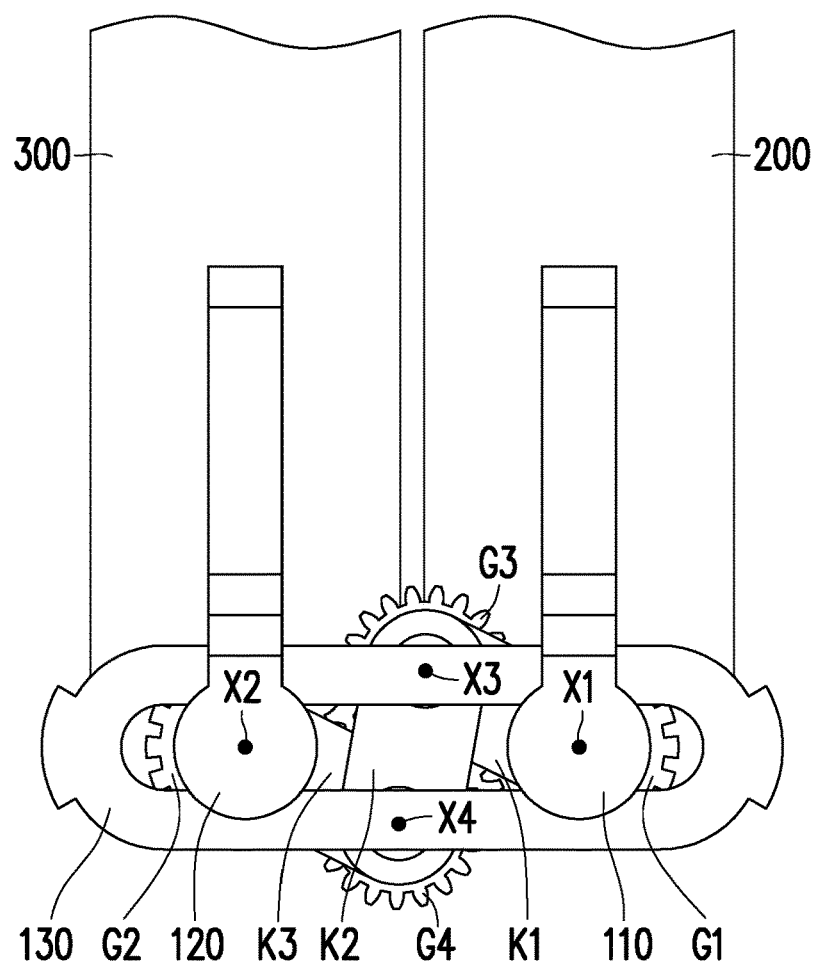
Figure 3B:
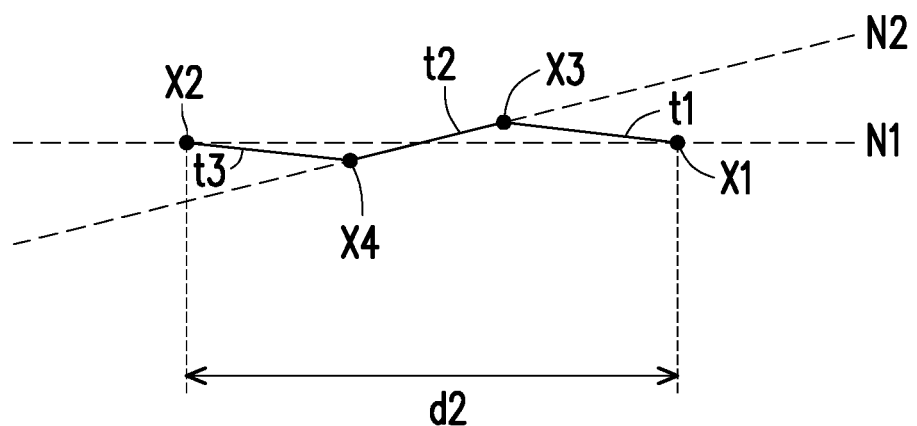
Figure 3B:
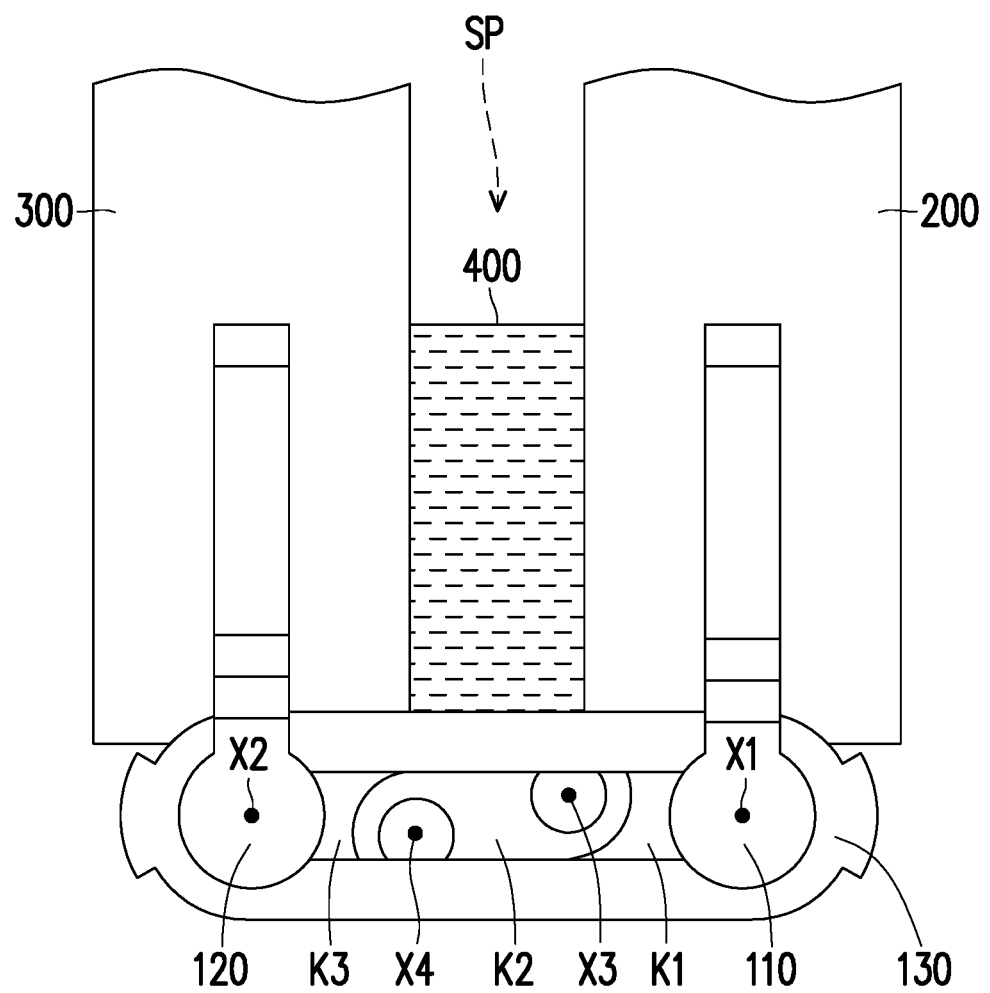

In addition, FIG. 3A and FIG. 3B are respectively side views of a portable electronic device in different states. Here, simple geometric illustrations are provided for relevant parameters in the same drawing to facilitate identification of the geometrical relationships between relevant components. Please refer to FIG. 3A and FIG. 3B at the same time. Due to the configuration of the links K1 to K3, it is possible to keep a center distance of engaged gears in the gears fixed. As shown in the drawings, due to the presence of the link K1, a center distance t1 of the rotation axis X1 of the first driving gear G1 and the rotation axis X3 of the driven gear G3 is kept fixed during the process of the relative movement of the first driving gear G1 and the driven gear G3. The same is also observed in a center distance t2 of the driven gears G3 and G4, and a center distance t3 of the driven gear G4 and the second driving gear G2. In this way, the dual-shaft hinge module 100 may be switched between states shown in FIG. 3A and FIG. 3B, that is, the relative distances d1 and d2 of the first shaft 110 and the second shaft 120 are changed along with different engagement positions of the driven gears G3 and G4 relative to the first driving gear G1 and the second driving gear G2 (wherein the relative distance d2 is greater than the relative distance d1), and the direction of change is along the extending direction of the limiting grooves 131 and 132.

Here, the rotation axis X1 of the first driving gear G1 and the rotation axis X2 of the second driving gear G2 form a first plane N1, the rotation axes X3 and X4 of the driven gears G3 and G4 form a second plane N2, and the second plane N2 is inclined relative to the first plane N1. Here, the specifications of the gears forming the configuration state above are as follows: first, the first driving gear G1, the second driving gear G2, and the driven gears G3 and G4 have the same module, for example, the module of the gears in the embodiment is m=0.25 or m=0.3. Furthermore, the first driving gear G1 and the second driving gear G2 have the same pitch diameter, the driven gears G3 and G4 have the same pitch diameter, and the pitch diameter of the first driving gear G1 and the second driving gear G2 is different from the pitch diameter of the driven gears G3 and G4. In addition, the embodiment further limits the relative distances d1 and d2 between the first driving gear G1 and the second driving gear G2, so that the driven gears G3 and G4 will not fall on the first plane N1.

Please refer to FIG. 3B again, when the first body 200 and the second body 300 move away from each other along with the first shaft 110 and the second shaft 120, an accommodation space SP is formed between the first body 200 and the second body 300. In the embodiment, the portable electronic device 10 also includes an accessory 400, which can be accommodated in or removed from the portable electronic device 10 according to the requirements. Since the relative distances d1 and d2 between the first shaft 110 and the second shaft 120 according to the embodiment are adjustable, the accessory 400 may be accommodated in the accommodation space SP to be carried along with the portable electronic device 10. At the same time, the application scope of the portable electronic device 10 may also be effectively broadened. For example, the portable electronic device may be a dual-screen electronic device without a physical input module, that is, the bodies 200 and 300 are respectively disposed with display screens or touch screens without any physical keys or a physical keyboard. By changing the state of the dual-shaft hinge module 100, the embodiment allows the portable electronic device in the state shown in FIG. 3B to dispose the additional accessory 400 (for example, the physical keyboard) between the bodies 200 and 300, so as to provide additional means of operation. At the same time, since the accessory 400 located in the accommodation space SP may be configured to support the first body 200 and the second body 300, the first shaft 110 and the second shaft 120 may be kept away from each other as shown in the state of FIG. 3B.

It should be noted that changes in the relative distance between the bodies 200 and 300 shown in FIG. 3A and FIG. 3B are only examples of the trend of change and do not limit the actual relevant sizes.

Figure 4:
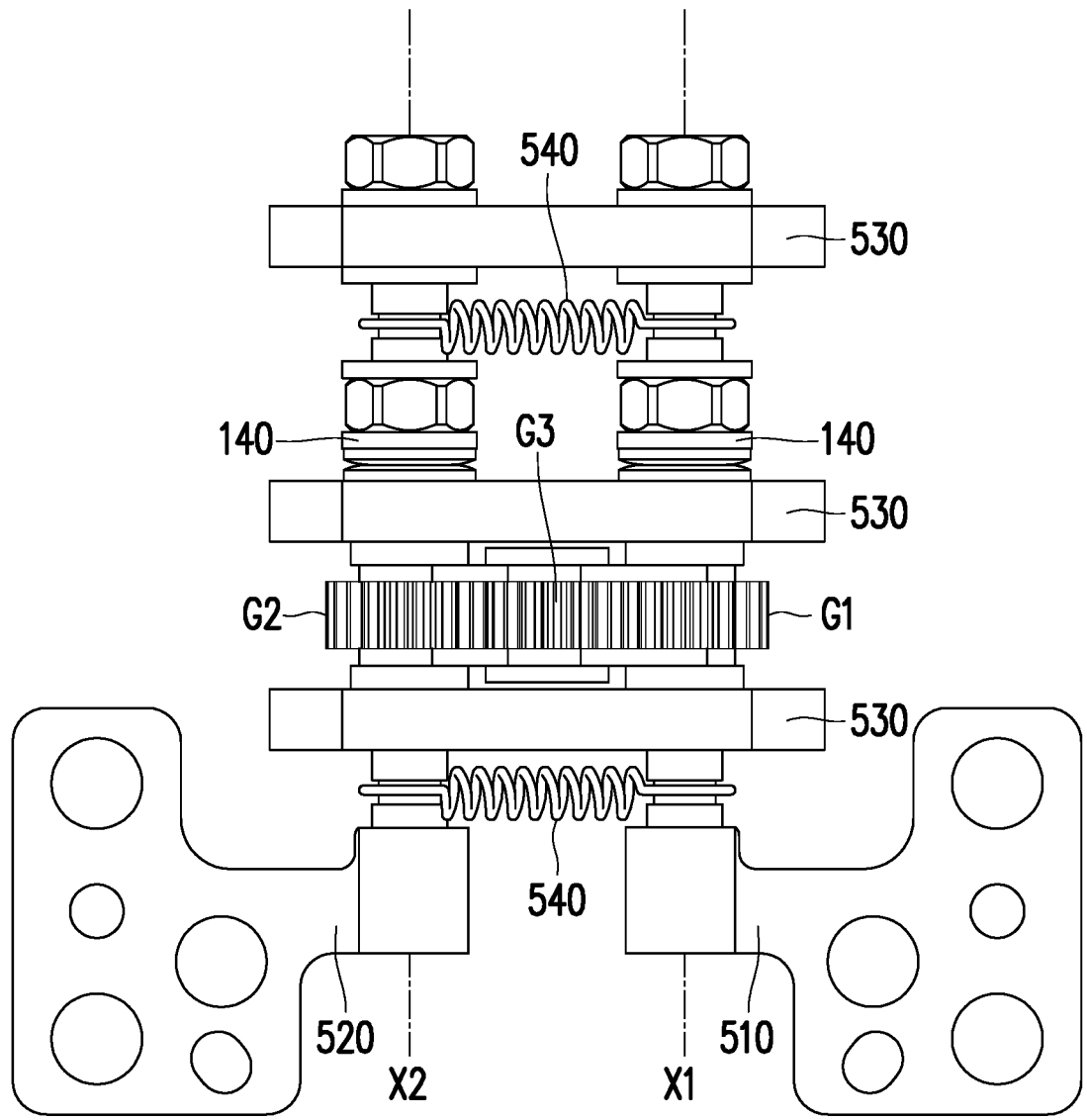
FIG. 4 is a top view of a dual-shaft hinge module according to another embodiment of the disclosure.

FIG. 4 is a top view of a dual-shaft hinge module according to another embodiment of the disclosure. Please refer to FIG. 4. In the embodiment, a dual-shaft hinge module 500 includes a first shaft 510 (having a rotation axis X1), a second shaft 520 (having a rotation axis X2), a limiting member 530, and the torque members 140 and the gear set as mentioned in the foregoing embodiment, wherein the gear set includes the first driving gear G1, the second driving gear G2, and the driven gears G3 and G4 in the foregoing embodiment. Here, the same components will not be reiterated.

Different from the foregoing embodiment, the lengths of the first shaft 510 and the second shaft 520 according to the present embodiment are lengthened to pass through the limiting member 530, so as to facilitate the configuration of a reset mechanism 540. Here, the reset mechanism 540 is disposed between the first shaft 510 and the second shaft 520, so that when the first shaft 510 and the second shaft 520 form multiple states due to changes in the relative distance, the reset mechanism 540 may be configured to drive the first shaft 510 and the second shaft 520 to be in one of the states. In the embodiment, the reset mechanism 540 is a spring connected between the first shaft 510 and the second shaft 520, and drives the first shaft 510 and the second shaft 520 to approach each other. For example, please refer to FIG. 3A and FIG. 3B at the same time. When the dual-shaft hinge module 500 allows the accessory 400 to be accommodated between the first shaft 510 and the second shaft 520 as shown in FIG. 3B, the first shaft 510 and the second shaft 520 may be kept away from each other due to the presence and support of the accessory 400. At this time, an elastic force is accumulated, which is equivalent to stretching, to deform the reset mechanism 540 (spring), so that once the accessory 400 is removed from between the first body 200 and the second body 300, the elastic force of the reset mechanism 540 (spring) drives the first shaft 510 and the second shaft 520 to approach each other, so as to restore the state shown in FIG. 3A.

In summary, according to the embodiments of the disclosure, the dual-shaft hinge module disposes the gear set between the first shaft and the second shaft, wherein the first driving gear of the gear set is disposed on the first shaft, the second driving gear is disposed on the second shaft, and the driven gears of the gear set are coupled between the first driving gear and the second driving gear, so that the first driving shaft and the second driving shaft can achieve the effect of synchronous rotation through the gear set. Furthermore, any two engaged gears of the gear set are further respectively pivoted through the links, such that the any two engaged gears can also keep the center distance fixed during the process of synchronous rotation. Accordingly, the gear set can adjust the relative distance of the first shaft and the second shaft according to the requirements under the limitation of the links.

Furthermore, the dual-shaft hinge module may further use the reset mechanism disposed between the first shaft and the second shaft to drive the first shaft and the second shaft to be in one of the deformed states, thereby providing an effort-saving effect to the user.

In this way, for the dual-shaft hinge module or the portable electronic device applying the dual-shaft hinge module, the relative distance between the shafts or the relative distance between the bodies can be adjusted accordingly, thereby providing additional space for utilization, such that the freed up space of the body can accommodate another additional accessory.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A dual-shaft hinge module, comprising:
a first shaft;
a first driving gear, disposed on the first shaft;
a second shaft;
a second driving gear, disposed on the second shaft;
a pair of driven gears, coupled between the first driving gear and the second driving gear; and
a plurality of links, respectively pivoted between the first driving gear and one of the pair of driven gears, between the pair of driven gears, and between another one of the pair of driven gears and the second driving gear, to respectively keep a center distance of the first driving gear and the one of the pair of driven gears, a center distance of the pair of driven gears, and a center distance of the another one of the pair of driven gears and the second driving gear fixed, wherein
a relative distance of the first shaft and the second shaft is changed along with different engagement positions of the pair of driven gears relative to the first driving gear and the second driving gear, wherein the first driving gear and the first shaft are coaxially disposed and synchronously rotated, the second driving gear and the second shaft are coaxially disposed and synchronously rotated, and the first shaft and the second shaft are synchronously rotated through the first driving gear, the pair of driven gears, and the second driving gear.

2. The dual-shaft hinge module according to claim 1, wherein a rotation axis of the first driving gear, a rotation axis of the second driving gear, and rotation axes of the pair of driven gears are parallel to one another.

3. The dual-shaft hinge module according to claim 1, wherein a rotation axis of the first driving gear and a rotation axis of the second driving gear form a first plane, rotation axes of the pair of driven gears form a second plane, and the second plane is inclined relative to the first plane.

4. The dual-shaft hinge module according to claim 1, further comprising a limiting member, having at least one limiting groove, wherein the first shaft and the second shaft pass through the at least one limiting groove of the limiting member in parallel with each other.

5. The dual-shaft hinge module according to claim 4, wherein the limiting member further has an accommodation groove, and the first driving gear, the second driving gear, and the pair of driven gears are located in the accommodation groove.

6. The dual-shaft hinge module according to claim 1, further comprising a reset mechanism, disposed between the first shaft and the second shaft, wherein when the first shaft and the second shaft form a plurality of states due to changes in the relative distance, the reset mechanism is configured to drive the first shaft and the second shaft to be in one of the plurality of states.

7. The dual-shaft hinge module according to claim 6, wherein the reset mechanism comprises at least one spring connected between the first shaft and the second shaft.

8. A portable electronic device, comprising:
a first body;
a second body;
a dual-shaft hinge module, comprising:
  a first shaft, assembled to the first body;
  a first driving gear, disposed on the first shaft;
  a second shaft, assembled to the second body;
  a second driving gear, disposed on the second shaft;
  a pair of driven gears, coupled between the first driving gear and the second driving gear; and
  a plurality of links, respectively pivoted between the first driving gear and one of the pair of driven gears, between the pair of driven gears, and between another one of the pair of driven gears and the second driving gear, to respectively keep a center distance of the first driving gear and the one of the pair of driven gears, a center distance of the pair of driven gears, and a center distance of the another one of the pair of driven gears and the second driving gear fixed, wherein a relative distance between the first shaft and the second shaft is changed along with different engagement positions of the pair of driven gears relative to the first driving gear and the second driving gear, and when the first body and the second body move away from each other along with the first shaft and the second shaft, an accommodation space is formed between the first body and the second body, wherein the first driving gear and the first shaft are coaxially disposed and synchronously rotated, the second driving gear and the second shaft are coaxially disposed and synchronously rotated, and the first shaft and the second shaft are synchronously rotated through the first driving gear, the pair of driven gears, and the second driving gear.

9. The portable electronic device according to claim 8, further comprising an accessory, disposed in the accommodation space, wherein the accessory is configured to support the first body and the second body to keep a state in which the first shaft and the second shaft are away from each other.

10. The portable electronic device according to claim 8, wherein a rotation axis of the first driving gear, a rotation axis of the second driving gear, and rotation axes of the pair of driven gears are parallel to one another.

11. The portable electronic device according to claim 8, wherein a rotation axis of the first driving gear and a rotation axis of the second driving gear form a first plane, rotation axes of the pair of driven gears form a second plane, and the second plane is inclined relative to the first plane.

12. The portable electronic device according to claim 8, wherein the dual-shaft hinge module further comprises a limiting member, having at least one limiting groove, and the first shaft and the second shaft pass through the at least one limiting groove of the limiting member in parallel with each other.

13. The portable electronic device according to claim 12, wherein the limiting member further has an accommodation groove, and the first driving gear, the second driving gear, and the pair of driven gears are located in the accommodation groove.

14. The portable electronic device according to claim 8, wherein the dual-shaft hinge module further comprises a reset mechanism, disposed between the first shaft and the second shaft, and when the first shaft and the second shaft form a plurality of states due to changes in the relative distance, the reset mechanism is configured to drive the first shaft and the second shaft to be in one of the plurality of states.

15. The portable electronic device according to claim 14, wherein the reset mechanism comprises at least one spring connected between the first shaft and the second shaft.

* * * * *